United States Patent [19]

Lassalle et al.

[11] 4,355,143

[45] Oct. 19, 1982

[54] PROCESS FOR THE POLYMERIZATION OF ETHYLENE AND THE RESULTING PRODUCTS

[75] Inventors: Dominique Lassalle; Laszlo Havas, both of Martigues, France

[73] Assignee: Naphtachimie, Courevoie, France

[21] Appl. No.: 75,897

[22] Filed: Sep. 17, 1979

[30] Foreign Application Priority Data

Sep. 22, 1978 [FR] France ................................ 78 27168

[51] Int. Cl.³ .......................... C08F 4/64; C08F 10/02
[52] U.S. Cl. .................................... 526/119; 526/125; 526/144; 526/352
[58] Field of Search ................ 526/124, 125, 144, 119

[56] References Cited

U.S. PATENT DOCUMENTS

| | | | |
|---|---|---|---|
| 3,029,231 | 4/1962 | Amerongen | 526/144 |
| 3,101,327 | 8/1963 | Lyons | 526/144 |
| 3,238,146 | 3/1966 | Hewett et al. | 526/125 |
| 3,642,746 | 2/1972 | Kashiwa et al. | 526/125 |
| 3,878,124 | 4/1975 | Durand et al. | 526/125 |
| 4,004,071 | 1/1977 | Aishima et al. | 526/144 |
| 4,056,668 | 1/1977 | Berger et al. | 526/124 |
| 4,089,808 | 5/1978 | Zucchini et al. | 526/125 |
| 4,124,532 | 11/1978 | Giannini et al. | 526/125 |

FOREIGN PATENT DOCUMENTS 1359547  7/1974  United Kingdom ............... 526/144

*Primary Examiner*—Edward J. Smith
*Attorney, Agent, or Firm*—McDougall, Hersh & Scott

[57] ABSTRACT

The invention concerns a process for the production of polyolefins with a wide range of distribution in respect of molecular masses.

The process comprises polymerizing ethylene, which is optionally accompanied by one or more other olefins, in contact with a catalytic system comprising:

(a) a catalyst comprising a solid compound of titanium, magnesium and a halogen such as chlorine or bormine (b) one or more organometallic compounds of a metal of groups II and III of the periodic table of elements (c) one or more halogenated ethylenic hydrocarbons.

The resulting polyolefins are particularly suitable for being shaped by means of extrusion-blowing.

13 Claims, No Drawings

PROCESS FOR THE POLYMERIZATION OF ETHYLENE AND THE RESULTING PRODUCTS

The present invention concerns a process for the production of polyolefins by polymerisation of ethylene alone or accompanied by other olefins by means of highly active catalytic systems, resulting in the formation of polymers with a wide range of distribution in respect of molecular masses.

It has already been proposed for ethylene to be polymerised within a liquid solvent, such as a saturated hydrocarbon, and in the presence of catalytic systems comprising a compound of titanium, generally titanium tetrachloride, an organoaluminium compound and a halogenated hydrocarbon, the effect of the latter compound being to maintain the catalytic system in the dissolved condition in the polymerisation solvent. Using this halogenated hydrocarbon makes it possible to produce polymers with molecular masses that are sufficiently low for it to be possible for the polymers subsequently to be shaped by injection or extrusion. In order to achieve a sufficient effect, it is however necessary to use relatively large amounts of halogenated hydrocarbon, this suffering from the disadvantage of substantially reducing the level of activity of the catalytic system.

It has also been proposed for ethylene to be polymerised in the presence of halogen and a catalytic system comprising a compound of magnesium and titanium or a compound of magnesium and vanadium, an organoaluminium compound and a saturated chlorinated hydrocarbon. In order to produce polyethylenes which have a sufficient width of distribution in respect of molecular masses, it is necessary to use substantial proportions of saturated chlorinated hydrocarbon, but this considerably reduces the degree of activity of the catalytic system and results in the formation of polymers which have poor rheological properties and which are accordingly difficult to put to use.

There has now been discovered a process for the polymerisation of ethylene, alone or accompanied by other olefinic monomers, by means of a highly active catalytic system which makes it possible to produce polymers which have a wide range of distribution in respect of molecular masses, and an elevated flow parameter. The width of distribution in respect of molecular masses, as referred to hereinbefore, is equal to the ratio of the molecular mass of weight $M_w$ to the molecular mass in number $M_n$, these two values being generally measured by gel permeation. The flow parameter $n$ is equal to the ratio:

$$\frac{\log(IF_{21.6}/IF_5)}{\log(21.6/5)}$$

wherein $IF_{21.6}$ and $IF_5$ represent the fluidity index of the polymer, as measured at a temperature of 190° C., under loads of 21.6 kg and 5 kg respectively.

The polymers produced in accordance with the present invention generally have a width of distribution in respect of molecular masses which is from 8 to 12, and a flow parameter which is from 1.9 to 2.5, which makes them particularly suitable for shaping by means of extrusion-blowing.

The subject of the present invention is a process for the polymerisation of ethylene, which is optionally accompanied by one or more olefins having the formula $CH_2=CHA$ wherein A is an alkyl radical containing from 1 to 8 carbon atoms, in contact with a catalytic system comprising:

(a) a catalyst comprising a solid compound of titanium, magnesium and a halogen such as chlorine or bromine, (b) one or more organometallic compounds of a metal of groups II and III of the periodic table, and (c) one or more halogenated hydrocarbons, the process being characterised in that the halogenated hydrocarbon or hydrocarbons is or are selected from compounds having the formula:

wherein:
$Y_1 = F$, Cl or Br
$Y_2, Y_3 = F$, Cl, Br or $C_nH_{2n+1}$, n being an integer of from 0 to 6
$Y_4 = C_nH_{2n+1}$
n being an integer of from 0 to 6 and that the molar ratio of the halogenated hydrocarbon or hydrocarbons set forth in (c) to the organometallic compounds set forth in (b) is from 0.01 to 1 and preferably from 0.05 to 0.15.

In the foregoing formula, the number 'n' in the radical $C_nH_{2n+1}$ is preferably 0 or 1; accordingly, the radical $C_nH_{2n+1}$ preferably comprises a hydrogen atom or the radical $CH_3$.

The halogenated hydrocarbon or hydrocarbons is or are advantageously selected from vinyl chloride, vinylidene chloride, 1,2-cis-trichloroethylene, 1,2-trans-trichloroethylene, 1-chloropropene and 1,2-dichloropropene.

The catalyst may be produced by reaction at a temperature of from $-20°$ to 150° C. and preferably from 60° to 90° C., of one or more compounds of tetravalent titanium, having the formula $TiX_{(4-n)}(OR)_n$ wherein X is a chlorine or bromine atom, R is an alkyl radical which may contain from 2 to 8 carbon atoms and n is an integer or a fraction which may be of any value from 0 to 4 and preferably from 0 to 2, and an organomagnesium compound having the formula MgXR or the formula $MgR_2$ wherein X and R are as defined above. The reaction between the tetravalent titanium compound or compounds and the organomagnesium compound is advantageously carried out in the presence of an alkyl halide having the formula RX wherein R and X are as defined above, these various compounds being used in molar ratios such that:

$0.1 \leq TiX_{(4-n)}(OR)_n/RMgX \leq 0.5$
and $1 \leq RX/RMgX \leq 2$
or
else $0.1 \leq TiX_{(4-n)}(OR)_n/MgR_2 \leq 0.5$
and $2 \leq RX/MgR_2 \leq 4$ If necessary, the organomagnesium compounds may be used in the form of complexes with electron-donor compounds such as ethers.

The catalyst may also be produced by reaction at a temperature of from $-20°$ to 150° C. and preferably from 60° to 90° C., of metal magnesium, one or more tetravalent titanium compounds and an alkyl halide, the latter compounds corresponding respectively to the formulae $TiX_{(4-n)}(OR)_n$ and RX, as defined above. In this case, the reactants are preferably used in molar ratios such that:

$0.1 \leq TiX_{(4-n)}(OR)_n/Mg \leq 0.5$ and $0.5 \leq RX/Mg \leq 10$ or preferably, $1, RX/Mg \leq 2$.

The organometallic compound or compounds of a metal of groups II and III of the periodic table preferably comprise organoaluminium compounds having the mean formula $AlR'_xZ_{(3-x)}$ wherein $R'$ represents an alkyl group containing from 1 to 16 carbon atoms and preferably from 2 to 12 carbon atoms, Z is a hydrogen atom or a halogen such as chlorine or bromine and x is an integer or a fraction which can be of any value from 1 to 3. Preferably, these compounds are selected from trialkylaluminiums having the formula $AlR'_3$, wherein $R'$ is an alkyl group as defined above.

These compounds are advantageously used in amounts such that the atomic ratio: metals of groups II and III of the co-catalysts/titanium of the catalysts is from 0.5 to 50.

Polymerisation is generally carried out under a pressure of less than 40 bars and at a temperature of from 40° to 150° C. This operation may be performed by introducing the monomers comprising ethylene and possibly other olefins, into a liquid diluent such as a saturated aliphatic hydrocarbon or, in the absence of diluent, by direct contact between the monomers in the gaseous condition and the constituents of the catalytic system. Polymerisation is carried out in the presence of a chain-growth limiter, generally comprising hydrogen, whose proportion by volume with respect to the olefins introduced into the polymerisation medium is from 1 to 80%, so as to produce a polymer having the desired fluidity number.

The constituents of the catalytic system may be used in different ways.

The catalyst may be introduced into the polymerisation reactor directly or in the form of a prepolymer produced by means of preliminary polymerisation of one or more olefins within an inert liquid such as an aliphatic hydrocarbon and in the presence of a solid compound of titanium, magnesium and a halogen, as defined in (a) above.

The organometallic compound or compounds of a metal of groups II and III of the periodic table may also be introduced directly into the polymerisation reactor. These compounds may also be used in the form of a porous carrier which has previously been impregnated with such compounds, in this case, the porous carrier may be inert, organic or inorganic, or may comprise the prepolymer referred to in the preceding paragraph.

The halogenated hydrocarbons may be introduced into the polymerisation reactor in mixture with the organometallic compounds; they may also be introduced into the polymerisation reactor separately, in two or more batches, in the course of the polymerisation operation.

EXAMPLE A

Preparation of a catalyst (catalyst A).

The following are successively introduced at a temperature of 25° C. into a 1 liter glass balloon flask provided with a mechanical agitator and a heating and cooling means:
- 500 ml of n-heptane
- 9.7 g of magnesium in powder form (0.40 gram-atom)
- 1.2 g of iodine.

While agitating the content of the balloon flask, the content is heated to a temperature of 80° C. and the following are introduced:
- 18.2 g of titanium tetrachloride (96 m. moles) and over a period of 3 hours, 74.5 g of n-butyl chloride (0.805 mole).

The precipitate obtained is washed three times, with intermediate decantation, with 200 ml of n-heptane. After drying, the resulting catalyst A is analysed; it contains 9.1% by weight of titanium.

EXAMPLE B

Preparation of a catalyst (catalyst B)

Operation is as set forth in Example A above, except that the 18.2 g of titanium tetrachloride is replaced by:
- 9.1 g of titanium tetrachloride (48 m. moles) and
- 13.65 g of tetrapropyltitanate (48 m. moles).

Catalyst B contains 8.1 g by weight of titanium.

EXAMPLE C

Preparation of a catalyst (catalyst C).

Firstly, n-butylmagnesiumchloride is prepared in a 1 liter balloon flask provided with a mechanical agitator, a reflux condenser and a means for heating or cooling the balloon flask by circulating a fluid in a jacket. The following are introduced into the balloon flask under a nitrogen atmosphere and at ambient temperature:
- 9.7 g (0.40 gram-atom) of magnesium in powder form
- 500 ml of n-heptane
- 37 g (0.40 mole) of n-butyl chloride
- an iodine crystal.

The reaction medium being heated to a temperature of 80° C., the reaction begins and is maintained under these conditions for a period of 2 hours. This results in a suspension of 0.40 mole of n-butylmagnesiumchloride in n-heptane.

Still under a nitrogen atmosphere, the n-butylmagnesium chloride suspension is heated to a temperature of 80° C., and a solution of 18.2 g (96 m. moles) of titaniumtetrachloride and 37.5 g (0.405 mole) of n-butylchloride in 150 ml of n-heptane is progressively introduced over a period of 2 hours, by means of a metering pump. When the operation of introducing these components has been concluded, the reaction medium is maintained at a temperature of 80° C., with agitation, for 1 hour.

The resulting precipitate is washed several times with n-heptane. The dried catalyst C contains 9% by weight of titanium.

Polymerisation type Example

This example sets forth the standard mode of operation used for testing catalytic systems.

1500 ml of n-heptane is introduced into a 3 liter stainless steel reactor provided with an agitator and a heating and cooling means, which has been previously purged by means of a stream of nitrogen, the 1500 ml of n-heptane then being heated to a temperature of 80° C., followed then by the addition of the constituents of the catalytic system and then hydrogen at a relative pressure of from 1.5 to 2 bars. Ethylene is then introduced at a constant flow rate of 120 g/h. Except in Examples 23, 24 and 25 the halogenated hydrocarbon is introduced into the reactor in two equal portions, the first being introduced as soon as the ethylene is introduced and the second being introduced after a period of 2 hours 30 minutes.

After 6 hours of polymerisation, the polymer formed is isolated, weighed and analysed. The degree of activity of the catalyst is deduced from the weight of the polymer formed and is expressed in grams of polymer produced per grams of titanium of the catalyst, per hour and per bar of measured relative ethylene pressure. In addition, measurements are made, in accordance with standard ASTM D 1238, conditions P and F, in respect of the fluidity numbers of the polymer under loads of 5 kg and 21.6 kg, this making it possible to calculate the flow parameter n=

$$\frac{\log(IF_{21.6}/IF_5)}{\log(21.6/5)}$$

In addition, the mean molecular mass in weight $M_w$ and the mean molecular mass in number $M_n$ of the resulting polymers are measured by gel permeation, from which the ratio $M_w/M_n$ is deduced.

EXAMPLES 1 to 18

In this series of examples, ethylene is polymerised in accordance with the standard mode of operation set forth in the above polymerisation type example, in the presence of an amount of catalyst A which corresponds to 0.375 milligram-atom of titanium and 3 m. moles of tri-n-octyl-aluminium. The results obtained with various unsaturated hydrocarbons are set forth in Table 1, in relation to two comparative tests $C_1$ and $C_2$ which were carried out under the same conditions, but in the absence of any halogenated hydrocarbon.

It will be noted that the ethylenic halogenated hydrocarbons used, even in very small proportions, result in a very substantial increase in the flow parameter and the width of distribution in respect of molecular masses $M_w/M_n$.

EXAMPLES 19 to 22

Operation in this series of examples is as set forth in Example 1, while changing the nature of the organometallic compound used. The results which are set forth in Table II shows the influence of the organometallic compounds on the fluidity numbers and the flow parameter.

EXAMPLES 23 to 25

This series of examples, the results of which are set forth in Table II, seeks to illustrate different modes of use of the halogenated hydrocarbons.

In Example 23, operation is as in Example 2, except that the whole of the dichloroethylene is introduced into the reactor as soon as the ethylene is introduced.

In Example 24, operation is as in Example 2, except that the whole of the dichloroethylene is introduced into the reactor in the form of a mixture with tri-n-octylaluminium which has previously been maintained at a temperature of 80° C. for 1 hour, before addition of the catalyst.

In Example 25, operation is as in Example 2, except that the whole of the dichloroethylene is introduced into the reactor in the form of a mixture with three m. moles of tri-isobutylaluminium which has been previously maintained at a temperature of 80° C. for 1 hour, before addition of the catalyst.

EXAMPLES $C_3$, $C_4$ and $C_5$

These examples, the results of which are set forth in Table II, are comparative examples illustrating use of saturated halogenated hydrocarbons instead of the unsaturated hydrocarbons of the invention. Operation is as in Example 2, with vinylidine chloride being replaced by 1,2-dichloroethane (Example $C_3$), 1,2,2'-trichloroethane (Example $C_4$) and 1,1',2,2'-tetrachloroethane (Example $C_5$).

It will be observed that the catalytic activity on the one hand and the fluidity numbers of the polymer on the other hand are greatly reduced, in comparison with the results obtained in the preceding Examples.

Examples 26 to 28 and comparative Examples $C_6$ to $C_8$

In Examples 26, 27 and 28, ethylene is polymerised in accordance with the standard mode of operation set forth in the polymerisation type example, in the presence of an amount of catalyst B which corresponds to 0.375 milligram-atom, 3 m. moles of an organoaluminium compound and vinylidene chloride. The nature of the compounds used, the amounts thereof and the results obtained are set forth in Table III, in comparison with the results obtained in comparative tests $C_6$, $C_7$ and $C_8$ which were carried out under the same conditions but without vinylidene chloride.

It will be noted that the addition of vinylidene chloride results in a substantial increase in the flow parameter, without causing a reduction in catalytic activity.

EXAMPLE 29 AND COMPARATIVE EXAMPLE $C_9$

In Example 29, ethylene is polymerised in accordance with the standard mode of operation set forth in the polymerisation type example, in the presence of an amount of catalyst C which corresponds to 0.375 milligram-atom of titanium, 3 m. moles of tri-octylaluminium and 0.3 m. mole of vinylidene chloride. The results obtained in Example 29 are set forth in Table IV, in comparison with the results of a comparative test $C_9$ which was carried out under the same conditions but in the absence of any halogenated hydrocarbon.

It will also be noted that in the presence of the catalyst C, the vinylidenechloride tends to increase in a very marked manner the flow parameter of the polyethylene produced.

TABLE I

| Example | Halogenated hydrocarbon nature | quantity m.moles | Relative pressure (bars) | Catalytic activity (g/gTi/h/bar) | Fluidity index at 190° C. under 5 kg | 21.6 kg | Flow parameter 'n' | $M_w/M_n$ |
|---|---|---|---|---|---|---|---|---|
| $C_1$ | — | 0 | 1.6 | 6 670 | 3.1 | 39 | 1.73 | 5 |
| $C_2$ | — | 0 | 2 | 5 550 | 2.4 | 29.9 | 1.72 | 6.1 |
| 1 | $CH_2=CCl_2$ | 0.3 | 2.6 | 5 210 | 2.8 | 52 | 1.99 | 8.2 |
| 2 | " | 0.3 | 2 | 6 040 | 2.4 | 47 | 2.03 | 8.7 |
| 3 | " | 0.3 | 1.8 | 5 520 | 2.2 | 44 | 2.05 | 9.4 |
| 4 | " | 0.3 | 1.2 | 5 130 | 0.7 | 25 | 2.44 | — |
| 5 | " | 0.6 | 2 | 5 520 | 1.9 | 34.4 | 1.98 | 11.3 |
| 6 | " | 0.9 | 2 | 5 520 | 1.45 | 26.8 | 1.99 | 9.2 |
| 7 | " | 0.9 | 2.2 | 4 790 | 1.9 | 37.8 | 2.04 | 10.2 |

TABLE I-continued

| Example | Halogenated hydrocarbon nature | quantity m.moles | Relative pressure (bars) | Catalytic activity (g/gTi/h/bar) | Fluidity index at 190° C. under 5 kg | Fluidity index at 190° C. under 21.6 kg | Flow parameter 'n' | $M_w/M_n$ |
|---|---|---|---|---|---|---|---|---|
| 8 | $CH_2=CHCl$ | 0.06 | 2 | 4 790 | 1.9 | 28 | 1.84 | 8 |
| 9 | " | 0.12 | 2 | 5 520 | 2.3 | 36 | 1.88 | 8.2 |
| 10 | " | 0.15 | 1.5 | 7 810 | 2.6 | 47.2 | 1.98 | 9.3 |
| 11 | " | 0.21 | 1.5 | 5 560 | 0.5 | 9.8 | 2.08 | — |
| 12 | " | 0.24 | 1.8 | 5 100 | 1.6 | 26 | 1.90 | 9.5 |
| 13 | $CH_3—CH=CHCl$ | 0.3 | 1.5 | 5 630 | 2 | 36.3 | 1.98 | — |
| 14 | " | 0.6 | 1.5 | 5 600 | 0.7 | 15.1 | 2.11 | — |
| 15 | $CH_3—CH=CCl_2$ | 0.21 | 1.5 | 5 130 | 2.8 | 56.2 | 2.05 | 8.7 |
| 16 | " | 1.2 | 1.5 | 6 060 | 1.9 | 35.8 | 2.04 | 8.2 |
| 17 | transCHCl=CHCl | 0.15 | 1.5 | 7 410 | 2 | 34.4 | 1.94 | 7.7 |
| 18 | " | 2.5 | 2 | 4 550 | 1.25 | 22.2 | 1.96 | 8.7 |

TABLE II

| Example | Organometallic compound nature | Quantity (m.moles) | Halogenated hydrocarbon nature | Quantity (m.moles) | $H_2$ relative pressure (bars) | Catalytic activity (g/gTi/h/bar) | Fluidity index at 190° C. under 5kg | Fluidity index at 190° C. under 21.6kg | Flow parameter 'n' |
|---|---|---|---|---|---|---|---|---|---|
| 19 | $Al(C_8H_{17})_2Cl$ | 3 | $CH_2=CCl_2$ | 0.3 | 2.5 | 4 450 | 1 | 17.5 | 1.95 |
| 20 | $Al_2(C_3H_{17})_3(C_2H_5)_2Cl$ | 3 | " | 0.3 | 2.5 | 5 630 | 4 | 59 | 1.84 |
| 21 | $Al(iso-C_4H_9)_3$ | 3 | " | 0.3 | 2.5 | 5 560 | 4.9 | 69 | 1.81 |
| 22 | $Al_2(iso-C_4H_9)_3(C_2H_5)_2Cl$ | 3 | " | 0.3 | 2.5 | 5 560 | 3 | 42 | 1.80 |
| 23 | $Al(C_8H_{17})_3$ | 3 | $CH_2=CCl_2$ | 0.3 | 1.6 | 5 210 | 0.9 | 17.5 | 2.03 |
| 24 | " | 3 | " | 0.3 | 2 | 4 400 | 0.6 | 11.3 | 2.00 |
| 25 | $Al(iso-C_4H_9)_3$ | 3 | " | 0.3 | 2 | 4 440 | 0.7 | 12.9 | 1.99 |
| $C_3$ | " | 3 | $CH_2Cl—CH_2Cl$ | 3 | 1.5 | 3 200 | 0.5 | 9.0 | 1.97 |
| $C_4$ | " | 3 | $CHCl_2—CH_2Cl$ | 1.5 | 1.5 | 1 670 | <0.1 | <1 | — |
| $C_5$ | " | 3 | $CHCl_2—CHCl_2$ | 0.4 | 1.5 | 3 140 | 0.15 | 2.7 | 1.97 |

TABLE III

| Example | Organometallic compound nature | Quantity (m.moles) | Halogenated hydrocarbon nature | Quantity (m.moles) | $H_2$ relative pressure (bars) | Catalytic activity (g/gTi/h/bar) | Fluidity index at 190° C. under 5 kg | Fluidity index at 190° C. under 21.6kg | Flow parameter 'n' |
|---|---|---|---|---|---|---|---|---|---|
| $C_6$ | $Al(C_8H_{17})_3$ | 3 | — | — | 1.5 | 4 170 | 14.9 | 137.5 | 1.52 |
| 26 | " | 3 | $CH_2=CCl_2$ | 0.3 | 1.5 | 4 050 | 6.2 | 69.5 | 1.65 |
| $C_7$ | $Al(iso-C_4H_9)_3$ | 3 | — | — | 1.5 | 3 180 | 8.4 | 80 | 1.54 |
| 27 | " | 3 | $CH_2=CCl_2$ | 0.6 | 1.5 | 3 030 | 4.8 | 49.8 | 1.60 |
| $C_8$ | $Al_2(C_8H_{17})_3(C_2H_5)_2Cl$ | 3 | — | — | 1.5 | 4 450 | 16.5 | 151 | 1.51 |
| 28 | " | 3 | $CH_2=CCl_2$ | 0.9 | 1.5 | 4 320 | 10 | 120.5 | 1.70 |

TABLE IV

| Example | organometallic compound nature | quantity (m.moles) | Halogenated hydrocarbon nature | Quantity (m.moles) | $H_2$ relative pressure (bars) | Catalytic activity (g/gTi/h/bar) | Fluidity numbers at 190° C. under 5 kg | Fluidity numbers at 190° C. under 21.6 kg | Flow parameter 'n' |
|---|---|---|---|---|---|---|---|---|---|
| $C_9$ | $Al(C_8H_{17})_3$ | 3 | — | — | 1.5 | 6 710 | 4.5 | 54.4 | 1.70 |
| 29 | " | 3 | $CH_2=CCl_2$ | 0.3 | 1.5 | 5 430 | 2.0 | 34 | 1.93 |

We claim:

1. A process for the production of polyolefins with a wide range of distribution in respect of molecular masses comprising polymerizing, in the presence of hydrogen, monomers selected from the group consisting of ethylene and ethylene and one or more olefins having the formula $CH_2=CHA$, in which A is an alkyl radical containing from 1 to 8 carbon atoms, in contact with a catalytic system comprising
   (a) a catalyst comprising a solid compound of titanium, magnesium and a halogen produced by reacting at a temperature within the range of −20° to 150° C.
      (1) one or more compounds of tetravalent titanium having the formula $TiX_{(4-n)}(OR)_n$ wherein X is a halogen, R is an alkyl radical which contains from 2 to 8 carbon atoms, and n is an integer or a fraction which can be any value from 0 to 4
      (2) magnesium as a metal or in the form of an organomagnesium compound having the formula RMgX, in which X and R are as defined above, or having the formula $MgR_2$ in which R is as defined above, and
      (3) an alkyl halide having the formula RX wherein R and X are as defined above,
   these various compounds being used in the molar ratio such that
   $0.1 \leq$ component (1)/component (2) $\leq 0.5$
   $1 \leq RX/RMgX \leq 2$ or $2 \leq RX/MgR \leq 4$ or $0.5 \leq RX/Mg \leq 10$ (b) one or more organometallic compounds of a metal of Groups II and III of the periodic table of elements, and (c) one or more halogenated hydrocarbons, the process being characterized in that the halogenated hydrocarbon(s) is selected from the compounds having the general formula:

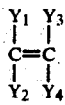

wherein:

$Y_1 = F, Cl$ or $Br$ $Y_2, Y_3 = F, Cl, Br$ or $C_nH_{2n+1}$, n being an integer of from 0 to 6

$Y_4 = C_nH_{2n+1}$ wherein n being an integer of from 0 to 6 and the molar ratio of the halogenated hydrocarbon(s) to the organometallic compounds is within the range of 0.01 to 1.

2. A process as set forth in claim 1 wherein the halogenated hydrocarbon or hydrocarbons is or are selected from compounds wherein the radical $C_nH_{2n+1}$ comprises a hydrogen atom or the radical $CH_3$.

3. A process as set forth in claim 1 wherein the halogenated hydrocarbon or hydrocarbons is or are selected from vinylchloride, vinylidene chloride, 1,2-cis-trichloroethylene, 1,2,-trans-trichloroethylene, 1-chloropropene and 1,2-dichloropropene.

4. A process as set forth in claim 1 wherein the catalyst is prepared from titanium tetrachloride as the tetravalent titanium compound.

5. A process as set forth in claim 1 wherein the catalyst is prepared jointly from titanium tetrachloride and tetrapropyltitanate as the tetravalent titanium compound.

6. A process as set forth in claim 1 wherein the organometallic compound(s) of a metal of groups II and III of the periodic table of elements comprise organoaluminium compounds having the mean formula $AlR'_xZ_{(3-x)}$, wherein R' represents an alkyl group containing from 1 to 16 carbon atoms, Z represents a hydrogen atom or a halogen and x is an integer or a fraction which can be of any value from 1 to 3.

7. A process as claimed in claim 6 in which the alkyl group contains 2–12 carbon atoms.

8. A process as claimed in claim 6 in which the halogen is chlorine or bromine.

9. A process as set forth in claim 1 wherein the organometallic compound(s) of a metal of groups II and III of the periodic table comprise tri-alkylaluminium having the formula $AlR'_3$ wherein R' represents an alkyl radical containing from 2 to 12 carbon atoms.

10. A process as claimed in claim 1 in which the halogen is chlorine or bromine.

11. A process as claimed in claim 1 in which n is an integer or fraction from 0 to 2.

12. A process as claimed in claim 1 in which the various compounds are used in the molar ratio such that $0.1 \leq \text{component}(1)/\text{component}(2) \leq 0.5$ and $1 \leq \text{component }(3)/ \leq 2$ component (2) is Mg or RMgX or $2 \leq \text{component }(3)/ \leq 4$ when component (2) is $MgR_2$.

13. A process as claimed in claim 1 in which the molar ratio of halogenated hydrocarbon(s) to the organometallic compounds is within the range of 0.05 to 0.15.

* * * * *